G. B. CLARKE.
Plow-Cleaner.
No. 42,838. Patented May 24, 1864.
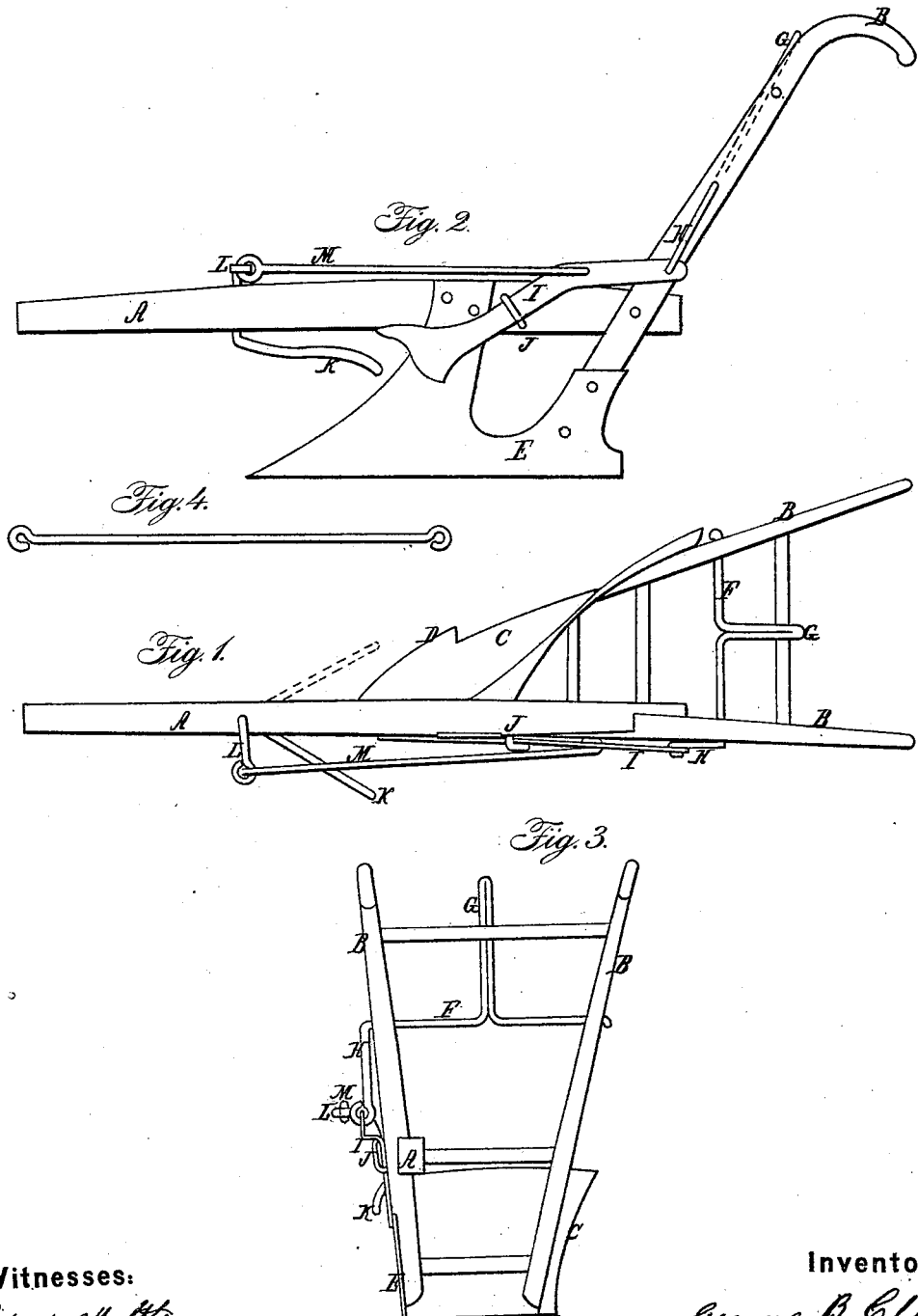
Witnesses:
Sidney Maltby
J. E. Dennis
Inventor:
George B. Clark
By his Atty J Dennis Jr

UNITED STATES PATENT OFFICE.

GEORGE B. CLARKE, OF LEONARDSVILLE, NEW YORK.

IMPROVEMENT IN PLOWS.

Specification forming part of Letters Patent No. 42,838, dated May 24, 1864.

*To all whom it may concern:*

Be it known that I, GEORGE B. CLARKE, of Leonardsville, in the county of Madison and State of New York, have invented certain new and useful Improvements on Plows for Removing Stubble and other Refuse Matter from before the Plow; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view of a plow with my improvements. Fig. 2 is an elevation of the side of the plow. Fig. 3 is an elevation of the rear of the plow.

The nature of my invention and improvement on the plow consists in arranging an arm or lever under the beam of the plow, which is vibrated by the plowman to remove stubble, stalks, manure, or any refuse matter that may collect under the beam before the plow; also, in arranging a traversing bar on the side of the plow-beam to be traversed by the plowman to push the stalks, straw, or other obstructions before the plow within the sweep of the vibrating lever or remove them from interfering with the plow.

In the accompanying drawings, A is the beam of the plow, B B the handles, C the mold-board, D the share, and E the landside, which may all be made in the form shown, or in such other form as will answer the purpose, and firmly fastened together.

F is a rock-shaft, fitted to work in holes in the handles, and provided with an arm, G, extending up, so that the plowman can reach it conveniently. This rock-shaft F has an arm, H, extending down from one end and connected to the traversing bar I, which works in the staple J on the side of the beam. This bar I is made in the form shown in the drawings—that is, its forward end extends both up and down, and is so shaped that when it is thrust forward and downward (imitating the motion of the plowman's foot in removing obstructions from before the plow) it will push any straw, stalks, or refuse matter which collect under the beam before the plow forward within the sweep of the arm K, which pushes it one side, out of the way of the plow. The lever or arm K and bar I are so arranged and connected that when the bar is thrust forward the arm moves to the left of the beam, and as the bar is drawn back the arm sweeps across under the beam to the right, carrying the matter which was pushed forward by the bar before it, so that it will fall into the furrow and be covered by the furrow-slice, which falls immediately upon it. This bar I will work best if the standard is made to come even with the side of the beam next to the bar.

The fulcrum of the arm or lever K may be made to work in the beam of the plow or in a stand fastened to the beam. This fulcrum of the arm K has an arm, L, above the beam A, which is connected by the link M to the bar I, as shown in the drawings, so that the plowman by vibrating the arm G of the rock-shaft traverses the bar I and vibrates the arm K at the same time.

The bar I may be used without the vibrating arm, and the vibrating arm K may be used without the bar I if the bar I and link M are removed and the long link M', Fig. 4, substituted to connect the arms H and L.

The advantages of my improvements consist in their removing the obstructions from before the plow while it is in motion and without stopping the team and plow.

I contemplate that my improvements may be made so as to be held together by screws and nuts, and also fastened to the plow with screw-bolts, so as to be readily removed from or applied to the plow; and that, instead of making the end of the bar I wide, a bar may be hinged to the beam A and bar I, so as to be vibrated forward and downward, and serve instead of the wide end of the bar I; and, also, that an arm may extend down from the rock-shaft F, so that the plowman may work the bar I and arm K with his foot.

I believe I have described and represented my improvements in plows, so as to enable any person skilled in the art to make and use them without further invention or experiment.

I will now state what I desire to secure by Letters Patent, to wit:

1. The vibrating lever K, working under the plow-beam to remove the stalks, straw, or other obstructions from before the plow.

2. In combination with the lever K, the link M, and arm G, to operate the lever K, substantially as described.

3. The traversing bar I, for the purpose of pushing the stalks, straw, and other obstructions into the sweep of the lever K or from before the plow.

GEORGE B. CLARKE.

Witnesses:
LUKE HOXIE,
WARREN H. COOLIDGE.